(12) United States Patent
Imura (10) Patent No.: US 6,261,138 B1
(45) Date of Patent: Jul. 17, 2001

(54) WIND-DRIVEN VESSEL (76) Inventor: Kaku Imura, No. 255-9, Immbe, Wakayama-Shi, Wakayama-Ken (JP), 640-8302

( * ) Notice: Subject to any disclaimer, the term of this patent is extended or adjusted under 35 U.S.C. 154(b) by 0 days.

(21) Appl. No.: 09/452,589

(22) Filed: Dec. 1, 1999

(30) Foreign Application Priority Data

Jan. 22, 1999 (JP) .................................. 11-014334

(51) Int. Cl.[7] .............................. B63H 13/00; B63H 9/00
(52) U.S. Cl. ........................................ 440/8; 114/144 RE
(58) Field of Search ......................... 440/3, 4, 8; 114/144

(56) References Cited

U.S. PATENT DOCUMENTS

| 1,181,988 | * | 5/1916 | Breitung .................................. 440/8 |
| 3,685,352 | * | 8/1972 | Pounder et al. ...................... 73/178 R |
| 3,964,426 | * | 6/1976 | Lindsey ................................. 440/8 |
| 4,040,374 | * | 8/1977 | Greene ............................. 114/144 C |
| 4,083,651 | * | 4/1978 | Cheney, Jr. et al. .................... 416/18 |
| 4,353,702 | * | 10/1982 | Nagy ..................................... 440/8 |
| 4,371,346 | * | 2/1983 | Vidal ..................................... 440/8 |
| 6,032,087 | * | 2/2000 | Yamamoto ........................... 701/21 |

FOREIGN PATENT DOCUMENTS

| 6-199287 | 7/1994 | (JP) . |
| 7-2179 | 1/1995 | (JP) . |
| 7-33086 | 2/1995 | (JP) . |

* cited by examiner

*Primary Examiner*—S. Joseph Morano
*Assistant Examiner*—Andrew Wright
(74) *Attorney, Agent, or Firm*—Barry R. Lipsitz; Douglas M. McAllister (57) ABSTRACT

A vessel comprising a windmill mechanism having a variable pitch propeller, a generator rotatably driven by the windmill mechanism, a storage battery for storing current generated by the generator, a screw rotatably driven by the windmill mechanism, a motor to rotatably drive the screw by means of discharge of the storage battery, a control device for propeller pitch, a direction sensor for determining the natural wind direction with respect to the vessel, and a rotor direction control device to keep the propeller of the windmill in a direction of the natural wind as sensed by said direction sensor. Such a windmill vessel is able to cruise by either one of the wind force, the wind force and electric power, or electric power in response to the direction of the natural wind. The influence of the outlook wind (self cruise wind) by forward movement of the vessel is evaded, and the propeller of the windmill is always kept in the direction of the natural wind. Excess energy achieved from the wind is stored as an electric energy which can be used to power an electric motor capable of driving the screw.

4 Claims, 7 Drawing Sheets

(PRIOR ART)

FIG. 7

(PRIOR ART)

WIND-DRIVEN VESSEL

BACKGROUND OF THE INVENTION

1. Field of the Invention

This invention relates to a wind-driven vessel which cruises by wind force energy. In particular, the invention relates to a wind-driven vessel which is driven by a windmill which normally rotates with respect to natural wind direction.

2. Description of the Prior Art

Vessels utilizing wind energy as a driving force are known, such as sailing vessels, yachts and windmill vessels. Although sailing vessels are simple in their structure, they are unable to sail against the wind direction. To the contrary, yachts which cruise by lifting force at the sails are able to move at an angle against-wind, but they are difficult to steer. Windmill vessels are driven by wind energy which is converted to rotational energy by a horizontal axis windmill or vertical axis windmill, said energy being transferred to a screw in the water, which enables the vessels to cruise against the wind.

Figure 6:
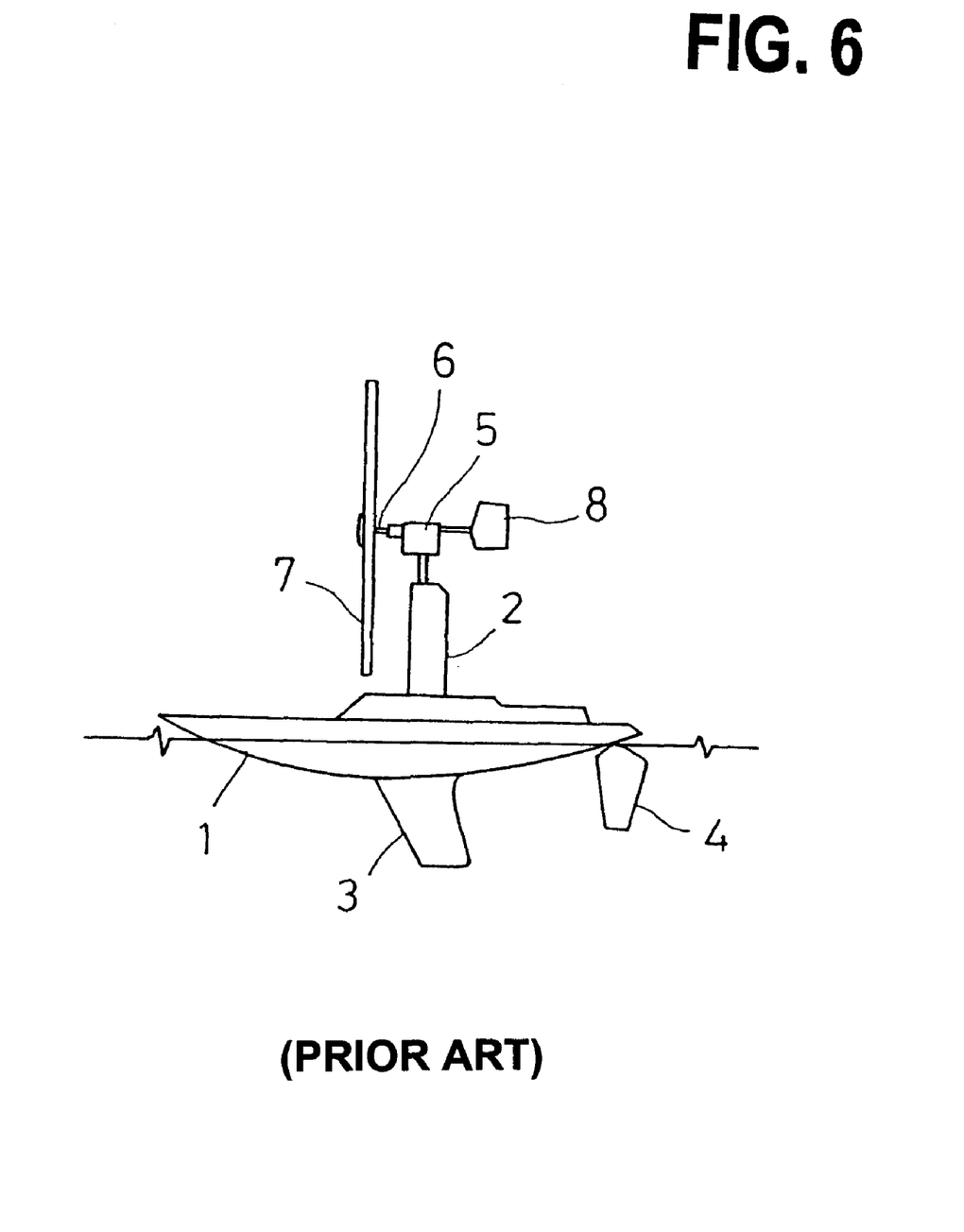
FIG. 6 shows a prior art windmill vessel.

Such prior art windmill vessels are shown in FIG. 6, in which numeral 1 is vessel body, 2 is a mast, 3 is a center board, 4 is a rudder, 5 is a link mechanism, 6 is a rotational shaft, 7 is a propeller type windmill, and 8 is an window check stabilizing plate by which a rotor of a propeller type windmill (rotational plane) is always kept in a wind direction and a rotation of the windmill is transferred to the screw (not shown) to power the vessel.

Figure 7:
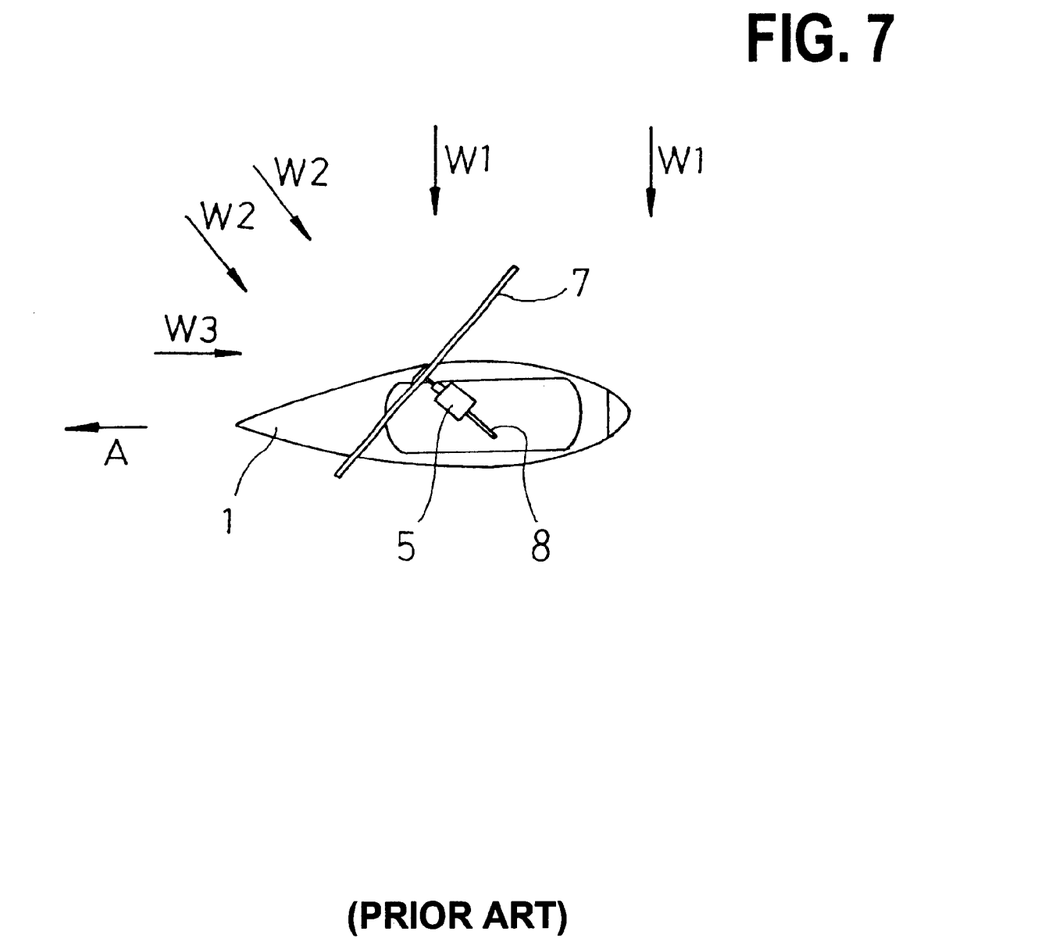
FIG. 7 shows a prior art windmill vessel with associated wind forces.

However, said windmill vessels are unable to efficiently utilize the energy of natural wind. For example, when the windmill vessel 1 cruises in a direction shown by arrow A with side winds W1, W2 as shown in FIG. 7, the vessel body receives the natural wind W1, W2 from the side when starting but receives the wind W2, W2 from a slant forward as the vessel cruises in the direction A. This is caused by an outlook wind (self cruise wind) W3, which is received by the vessel. As a result, the vessel receives the slant front winds W2, W2 caused by the mutual effect of the side natural wind W1 and the outlook wind (self cruise wind) W3 from the front. Accordingly, a rotor of the windmill 7 rotates in a direction of the slant front winds W2, W2 as an affect of window check stabilizing plate 8.

In other words, the vessel converts the energy of the slant front winds W2, W2 to a rotational energy to enable cruising. Hence, only the residual energy of W2 is utilized (i.e. the reduction in the natural wind W1 energy due to the effect of the outlook wind (self cruise wind) W3).

An additional drawback of such prior art windmill vessels is that when the windmill vessel receives the natural wind from the front of the vessel or from behind the vessel, it is unable to cruise at a speed higher than the wind velocity.

SUMMARY OF THE INVENTION

To overcome the drawbacks of the prior art, the present invention provides a vessel comprising a windmill mechanism having a variable pitch propeller, a generator rotatably driven by the windmill mechanism, a storage battery for storing current generated by the generator, a screw rotatably driven by the windmill mechanism, a motor to rotatably drive the screw by means of discharge of the storage battery, a control device for propeller pitch, a direction sensor for the natural wind with respect to the vessel, and a rotor direction control device to keep the rotor of the windmill in a direction of the natural wind sensed by said direction sensor. The invention provides for a windmill vessel which is able to cruise by either one of the wind force, the wind force and electric power, or electric power in response to the direction of the natural wind. The influence of the outlook wind (self cruise wind) by forward movement of the vessel is evaded, and the rotor of the windmill is always kept in the direction of the natural wind. Surplus energy achieved from the wind is stored as electric energy which can be used to drive the screw.

In said arrangement, the windmill mechanism may have a variable pitch propeller fixed at a horizontal rotational shaft, a vertical rotational shaft which follows the horizontal rotational shaft and rotates, a support for said horizontal rotational shaft and a revolving device for the support.

Additionally, the vessel may have a steering control device to decide a steering angle in response to a wind direction of a synthesized wind (synthesis of the natural wind and the outlook wind generated by the movement of the vessel) in order to keep a given running path of the vessel, and means for controlling said steering means based on data relating to ebb flow.

Furthermore, said natural wind direction sensor for the vessel may have means for measuring vessel cruising direction, which may include a speedometer, a means for measuring the synthesized wind (the synthesis of the natural wind and the outlook wind created by the movement of the vessel), and a means for determining the natural wind direction from the measured value at each of said measuring means.

Said rotor direction control device may have driving means for driving a rotational device for the support of the horizontal rotational shaft in a given amount and fixing said rotational device in the desired position, and means for controlling said drive means based on the data from the natural wind direction sensor.

Said propeller pitch control device may have a pitch conversion arm, and means for driving and controlling said pitch conversion arm.

Still furthermore, the vessel may have means for controlling cruise to the destination and setting in real time, and controlling thrust force of the vessel by controlling a revolution of the windmill, generator and motor in response to each datum of the present position, a set target position data, direction and speed of the natural wind at current time, and direction of the ebb flow, thereby setting the vessel thrust force as one of wind force, electric power, or the wind force and electric power in combination.

The vessel may have a raft with a solar battery for charging the storage battery.

DETAILED DESCRIPTION OF THE INVENTION

Figure 1:
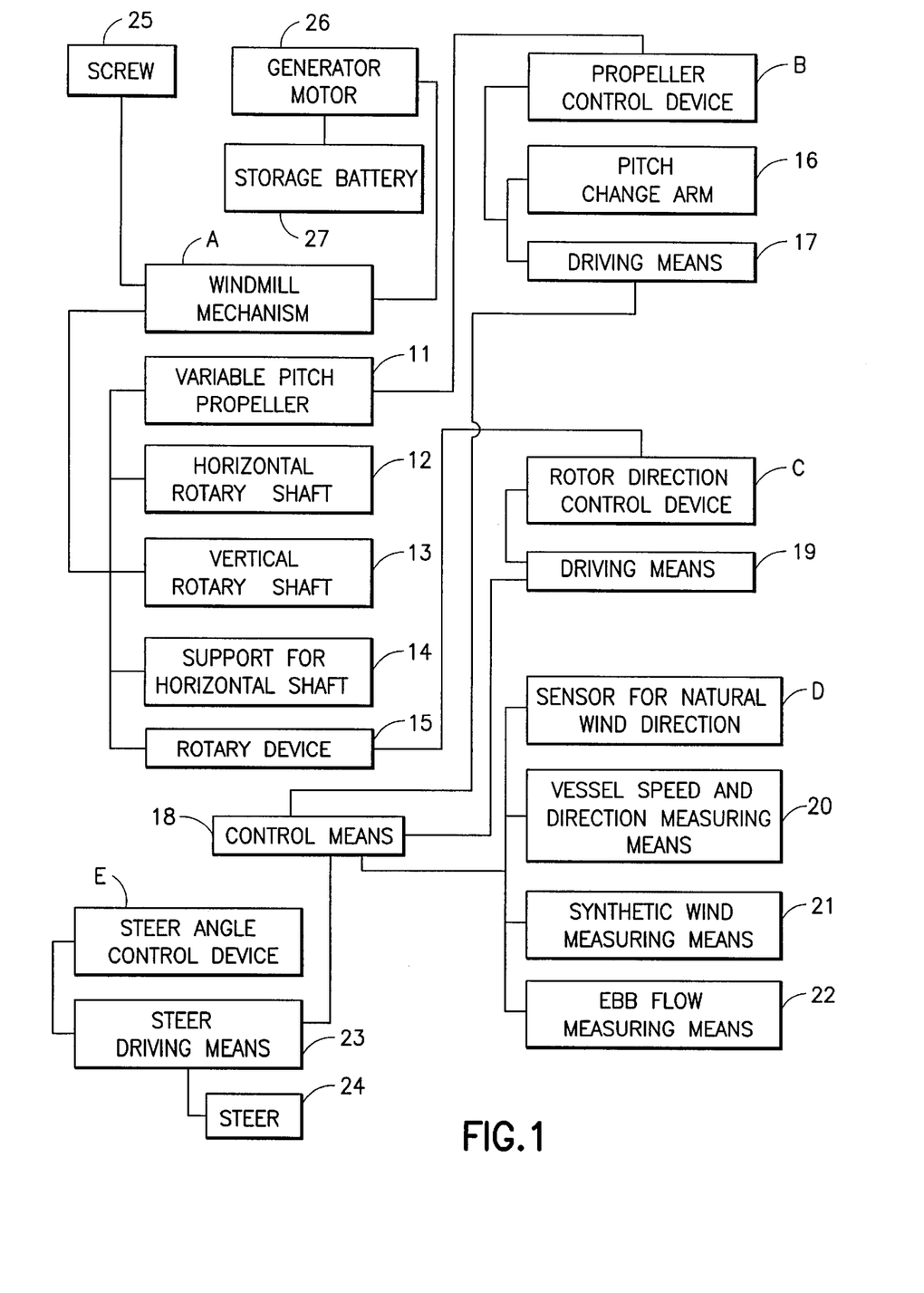
FIG. 1 is a block diagram showing major structure of the wind-driven vessel.

The preferred embodiment of the present invention will be hereinafter discussed with reference to the accompanying drawings. FIG. 1 is a block diagram showing a major structure of the wind-driven vessel of this invention. The windmill mechanism A has a horizontal rotational shaft 12, with a variable pitch propeller 11, a vertical rotational shaft 13 rotating following said horizontal rotational shaft 12, a support 14 for said horizontal rotational shaft 12 and a rotatable device 15 for rotating said support 16 in a horizontal direction. A propeller pitch control device B has a pitch conversion arm 16 linked to said variable pitch propeller 11, driving means 17 and control means 18. A rotor (rotational plane of propeller) direction control device C has a diving means 19 engaged to the rotational device 15 at said support 14 and rotate thereof, and control means 18 to control function of said driving means 19. A direction sensor D for the natural wind on the vessel has means 20 for measuring vessel speed/direction, means 21 for measuring synthesized wind (synthesis of the natural wind and outlook wind generated as the vessel cruises), means 22 for measuring ebb flow direction and speed of the flow, and means 18 for determining the direction of the natural wind with respect to the vessel based on the measured values.

A steering angle control device E has a steer driving means 23, and means 18 for controlling the function of said steer driving means 23 in response to the speed of the natural wind and the synthesized wind, the ebb flow direction and velocity.

Based on said structure, the basic function of the windmill vessel relating this embodiment will be hereinafter discussed. At start of the cruise, a directional data of the natural wind according to the natural wind direction sensor D is fed to a rotor (propeller rotational plane) direction control device C, which actuates a rotational device 15 of the windmill mechanism A based on said natural wind data to rotate the variable pitch propeller 11 to a position to receive the natural wind at its front, and thereby to keep this position.

The variable pitch propeller 11 begins to rotate with receipt of the natural wind, and this rotation is transmitted to a screw 25 through a horizontal rotational shaft 12 and a vertical rotational shaft 13 so as to start movement of the wind-driven vessel. During the movement of the vessel, the direction sensor D of the natural wind, and the rotor direction control device C function so as to rotate the rotational plane of the variable pitch propeller 11 to a position so as to receive the natural wind at its front and thereby to keep the position.

A steering angle control device E adjusts an angle of the rudder 24 based on the measured data such as the synthesized wind velocity, the ebb flow direction wind velocity and the vessel speed, so as not to be out of the given direction of the vessel by an influence of the synthesized wind.

The propeller pitch control device B varies rotational speed and rotational force of the propeller 11 and propeller pitch. Although the rotational energy of the windmill is mainly used for the rotation of the screw 25 to move the vessel, it may also be is used for the generator motor 26. Electric power generated may be stored in a storage battery 27.

The control device 18 arbitrarily processes each datum of a target position datum, direction and speed of the current natural wind, and ebb flow direction and velocity, in order to control the functions of the windmill, generator and motor so as to set the thrust force of the vessel as one of the wind force, electric power, or wind force and electric power. In this way, the control device functions in the manner of a cruise control device to set the cruise course toward the objective place in real time.

Figure 2:
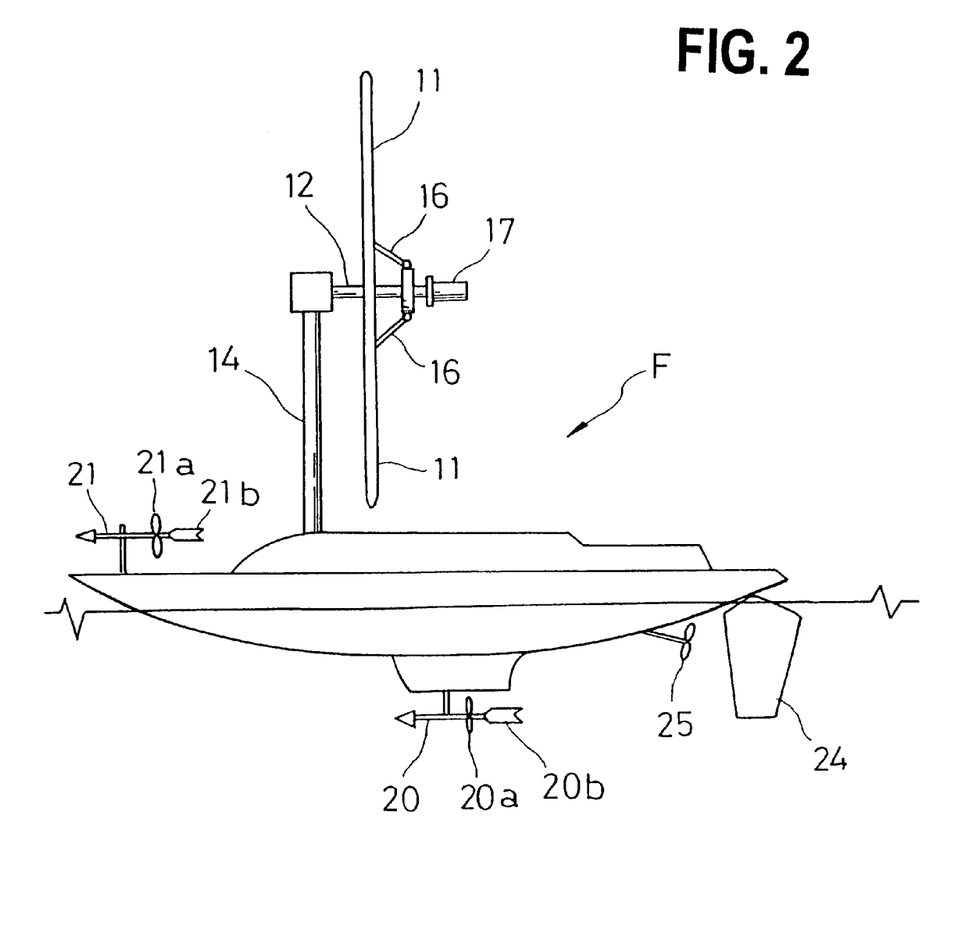
FIG. 2 is a side view of the wind-driven vessel F having the major structure shown in FIG. 1.

The preferred embodiment of this invention will be further discussed with reference to FIG. 2. FIG. 2 is a side view of the wind-driven vessel F having the major structure shown in FIG. 1.

A pair of variable pitch propellers 11 are in opposite relation, and fixed onto the horizontal rotational shaft 12. A support 14 supports a horizontal rotational shaft 12, which is able to rotate in all directions, having a rotating device 15 at its lower end, as discussed below. A pitch conversion arm 16 has a servo motor 17 as its driving means. A sensor 20 is provided as a means for measuring the vessel speed and direction constituting a direction sensor D of said natural wind, and has a rotary member 20a and a stabilizing plate 20b. A sensor 21 is provided as a means for measuring the synthesized wind and has a rotary member 21a and a wind check stabilizing plate 21b. As an ebb flow measuring means, the vessel has a whole earth measuring device (Global Positioning System) to determine deviation from another point expected by the vessel speed and cruising direction from a given point and a point actually reached, so as to measure velocity and direction of the ebb flow.

Figure 3:
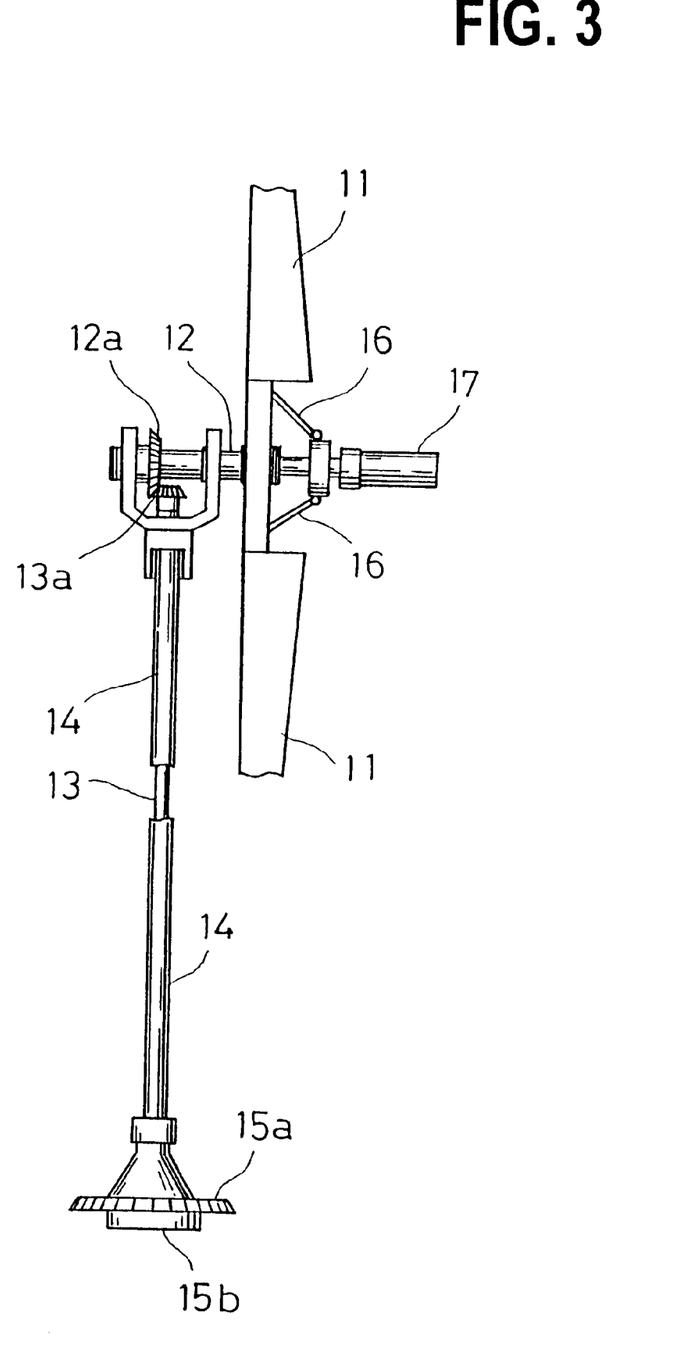
FIG. 3 is an enlarged scale view of the windmill mechanism A.

FIG. 3 is an enlarged scale view of the major portion of the windmill mechanism. One end of the horizontal rotational shaft 12 and upper end of the vertical rotational shaft 13 are meshed with worm gears 12a and 13a provided on each shaft, so that mutual rotations are transmitted. At a lower end of the support 14 of the horizontal rotational shaft in a pipe shape through which the vertical rotational shaft 13 is passed, is a rotary device 15 which has an worm gear 15a and its receipt member 15b, whereby a rotation of the worm gear 15a causes the support 14 to rotate. As a result, a rotary plane of the variable pitch propellers 11 (i.e. the rotor) is able to be oriented in a required direction.

Figure 4:
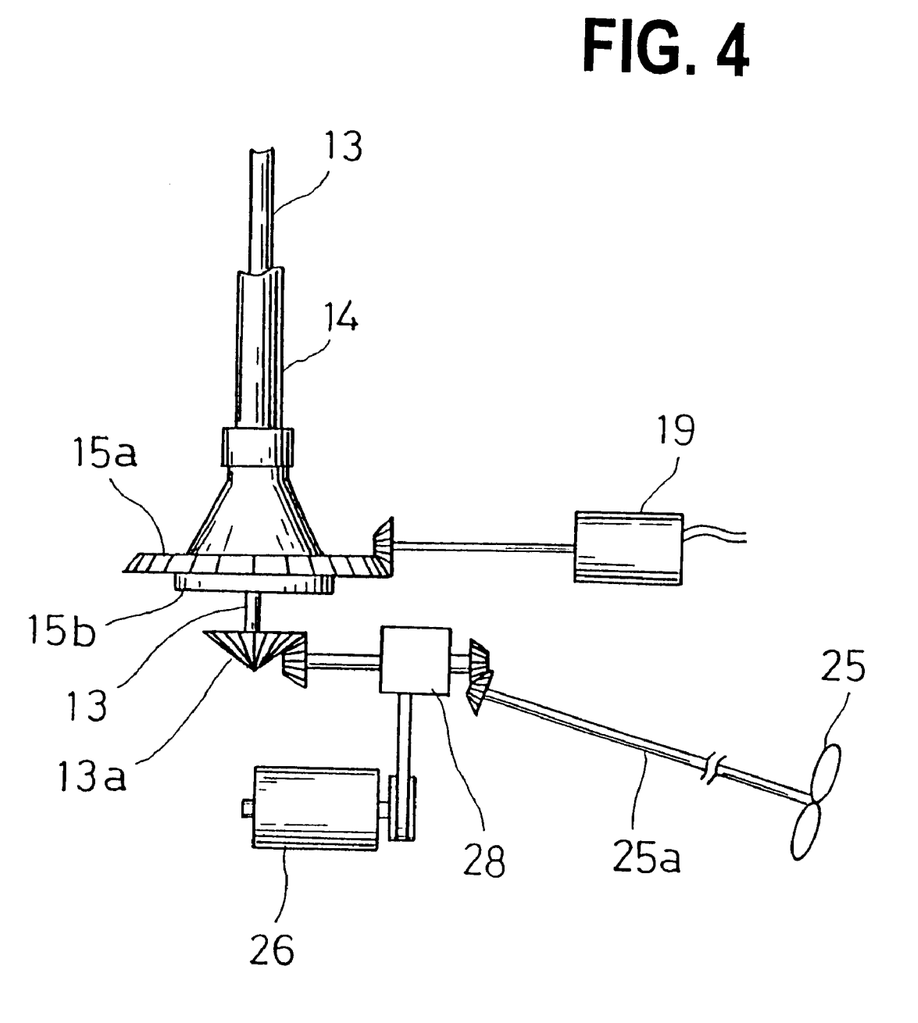
FIG. 4 is a view showing relative structure of the windmill mechanism A, a motor direction control device C, a screw 25, and a generator-motor 26, et al.

FIG. 4 is a view showing the relative structure of the windmill mechanism A, a rotor direction control device C, a screw 25, and a generator motor, et al. A lower end of the vertical rotational shaft 13 and a rotating shaft of a clutch device 28 are meshed through an worm gear. The variable pitch propeller 11 transmits its rotation to a screw rotating shaft 25a through the clutch device 28 thereby rotating the screw. On the other hand, at lower end of the horizontal rotational shaft 12 support 16 is a rotary device 15 which has an worm gear 15a and its receiving member 15b. A rotary shaft of the servo motor 19 as a driving means constituting the rotor direction control device C meshes with said worm gear 15a through a worm gear, and a control signal from controller 18 in response to a measured data from said natural wind sensor D actuates the servo motor 19 to rotate a rotor of the windmill mechanism A (propeller rotary plane) in a natural wind direction and always keep its position.

Another rotary shaft of the clutch device 28 and a rotary shaft of the generator motor 26 are linked by a rotary belt and its generated power charges the storage battery, which causes the generator motor to rotate and to rotate the screw 25 through the clutch device 28.

Although the steering angle control device E mentioned in FIG. 1 is not shown in FIG. 2 and so on, means 23 for driving the steering control device E comprises a servo motor controlled by the control means 18 in its operation. Cruising examples of the wind-driven vessel relating said embodiment will be hereinafter discussed.

Figure 5:
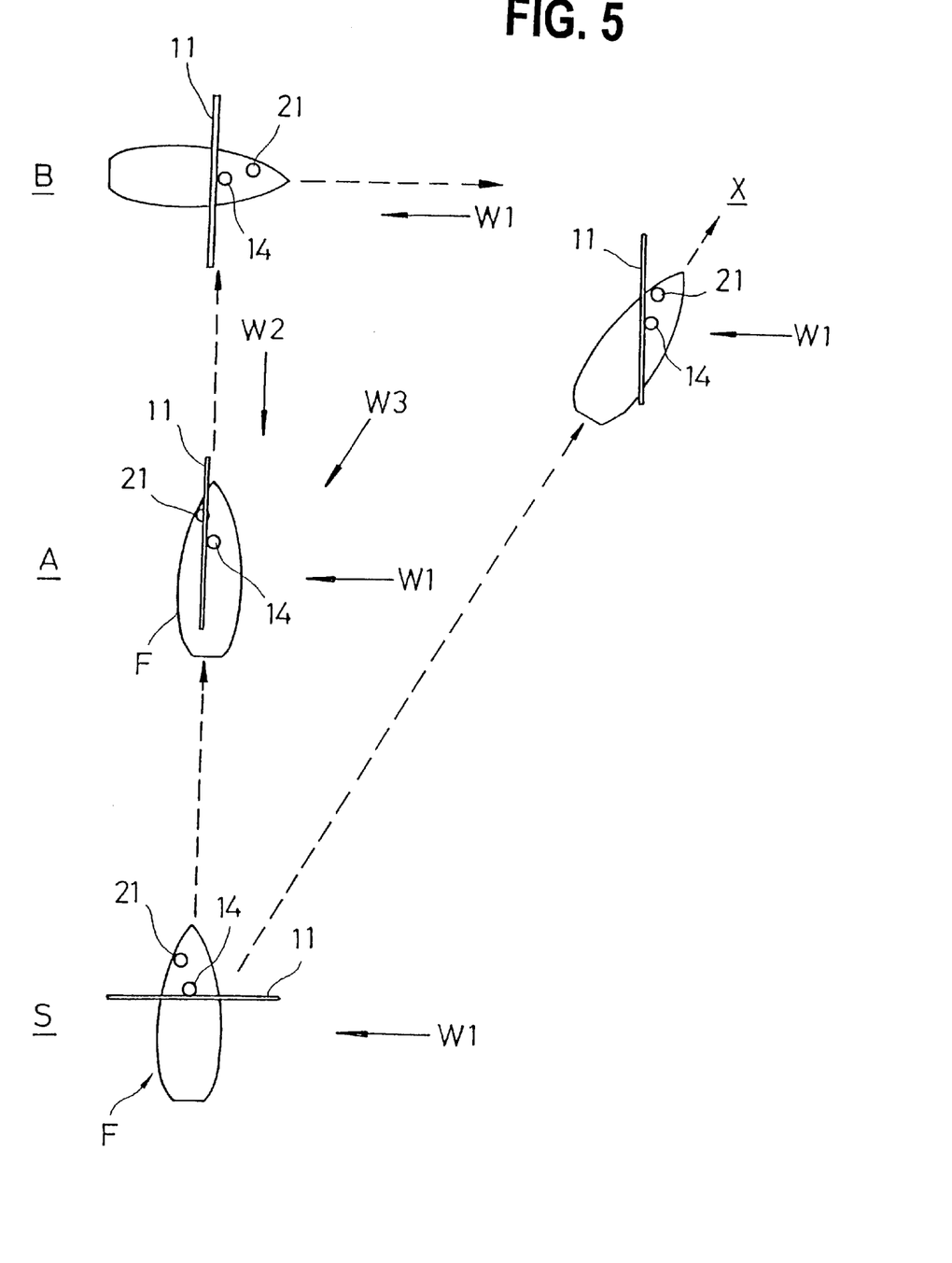
FIG. 5 shows an instance of cruising by a vessel shown in FIG. 2.

FIG. 5 is a view showing a cruising example from stoppage position S to an objective point X. There may be two courses toward the goal X, S-A-B-X and S-X. First, at S point, the direction sensor D for the natural wind determines the data measured at the synthesized wind measuring means 21, and the vessel speed direction measuring means 20 by aid of the control device 18 so as to sense sideward natural wind W1 toward the vessel F. Then, a control signal based on the natural wind direction data is fed to the servo motor 19 as a means for driving the rotor direction control device C a given angel of rotation based on the control signal of the servo motor 19, which causes the support 14 of the horizontal rotary shaft 12 to rotate to keep the rotor of the windmill, i.e. rotary plane of the propeller 11, in position opposite to the direction of the natural wind W1 as shown.

If the natural wind W1 is 8 meters per second, an operation of the clutch device 28 causes a rotary shaft of the screw 25 and driving system of the windmill mechanism A to link thereof so as to start the vessel F and cruises in straight course via A point to B point. During said movement, the direction control device D for the natural wind operates to continuously sense the direction of the natural wind, data of which causes the rotor direction control device D and the rotor direction control device C to position the windmill rotor against the natural wind. In other words, data measured of vessel speed and direction measuring means 20, the synthetic wind measuring means 21, and ebb flow measuring means 22 are determined by the control device 18, which feeds a directional data of the natural wind to the rotor direction control device C in real time. In this embodiment, direction of the natural wind is determined by the rotation number of the rotary member 20a of the vessel speed and direction measuring means 20 and a rotary number of the rotary member 21a of the vessel direction and synthetic wind measuring means 21, direction of the synthetic wind and ebb flow direction and velocity by the ebb flow measuring means 22.

During a duration from S point via A point to B point, the vessel receives the natural wind W1 from the side and cruises at N per second. For this reason, the vessel F receives outlook wind (natural wind) W2 at N per second from the forward cruising direction. For this reason, the vessel F actually receives synthetic wind W3 of the natural wind W1 and self run W2. Therefore, the rotary plane of the propeller 11 receives the synthetic wind W3, causing the vessel F to rotate W3 direction in its cruising run direction. Hence, straight cruise becomes difficult.

In this case, there is a need to keep the cruising path of the vessel F by adjusting steer angle. The steer angle control device E adjusts the steering angle in this embodiment. The synthetic wind speed and direction data provided by the synthetic wind measuring means 21 of the direction sensor D for said natural wind causes the servo motor 23 as steer driving means for the steering angle control device E to control the servo's function so as to provide necessary steer angel at the rudder 24, so that straight cruise between S-A-B is kept.

When the vessel F arrives at the B point to orient the vessel toward the X point, function of the rotor direction control device C causes the rotary plane of the propeller 11 to rotate to keep the vessel in position opposite to the natural wind W1. Between the B point and X point, the direction of the natural wind W1 and cruising direction of the vessel F become completely opposite.

The vessel F cruises against the wind, but balances at the cruising speed of half of the natural wind speed. Then, if the energy achieved through the windmill for the natural wind W1, by dropping the vessel speed, is utilized in branching the screw rotation and generator rotation, thereby providing better energy efficiency.

To this end, the propeller pitch control device B caused propeller 11 pitch to change during the cruise, to adjust the rotation number and rotation force. As shown in FIG. 5, it is also advisable to move directly from the S point to X point, taking the natural wind velocity and ebb flow condition, into consideration.

Course setting of various conditions may be conducted manually, but it is advisable to locate a cruise control device to set either one of the wind force, electric power, or wind and electric power for the vessel thrust by controlling rotation of the windmill, generator and motor in response to each datum of current position and set object position date, direction and velocity of the current time natural wind, direction and velocity of the ebb flow, and to set the cruising course toward a target position in real time, so the automatic selection of cruising energy and course selection are conducted.

As the wind-driven vessel relating this embodiment has a generating raft utilizing a solar battery, not only wind energy but also solar energy is stored in a storage battery, which is convenient for cruising condition where the wind-driven cruise is not appropriate.

What is claimed is:

1. A wind-driven vessel cruisable by one of wind force, wind force and electric power, or electric power, comprising:

a. a windmill mechanism having a variable pitch propeller fixed at a horizontal rotary shaft, said horizontal rotary shaft connected to a vertical rotary shaft which rotates in response to the rotation of the horizontal rotary shaft and having a support for said rotary shaft and a rotary device for said support;

b. a generator rotatably driven by said windmill mechanism;

c. a storage battery for storing generated current;

d. an electric motor capable of running on said storage battery;

e. a screw which can be rotatably driven by at least one of said windmill mechanism and said electric motor;

f. a control device for controlling propeller pitch, comprising a pitch varying arm, means for driving said arm, and a control means;

g. a natural wind direction sensor for detecting natural wind direction with respect to the vessel, said natural wind direction sensor capable of measuring cruising direction, cruising speed, synthetic wind direction, ebb and flow direction and speed, said natural wind direction sensor further comprising an operating means for determining the direction of the natural wind from said measured values;

h. a rotor directional control device to keep the windmill propeller in a direction of the natural wind as sensed by said direction sensor, comprising driving means for driving the rotary device to a given value and fixing the rotary device in a desired position in response to the rotor directional control device based on data from the natural wind direction sensor;

i. a steer angle control device to determine steer angle in response to wind direction and velocity of the synthetic wind, said steer control device comprising a steer driving means responsive to said steer angle control device based on the measured values of the synthetic wind and the ebb and flow; and j. a cruise control device to control windmill, generator, and motor revolution in response to each datum of current position and set target position data, current direction and velocity of the natural wind, and direction and velocity of the ebb and flow, so as to set thrust force of the vessel as either one of wind force, electric power, or the wind force and electric power, and to set a cruising course toward the target point in real time.

2. A vessel in accordance with claim 1, further comprising a raft with a solar battery thereon for charging the storage battery.

3. A wind-driven vessel cruisable by one of wind force, wind force and electric power, or electric power, comprising:

a. a windmill mechanism having a variable pitch propeller;

b. a generator rotatably driven by said windmill mechanism;

c. a storage battery for storing generated current;

d. an electric motor capable of running on said storage battery;

e. a screw which can be rotatably driven by at least one of said windmill mechanism and said electric motor;

f. a control device for controlling propeller pitch;

g. a natural wind direction sensor for detecting natural wind direction with respect to the vessel, said natural wind direction sensor capable of measuring cruising direction, cruising speed, synthetic wind direction, ebb and flow direction and speed, said natural wind direction sensor further comprising an operating means for determining the direction of the natural wind from said measured values;

h. a rotor directional control device to keep the windmill propeller in a direction of the natural wind as sensed by said direction sensor;

i. a steer angle control device to determine steer angle in response to wind direction and velocity of the synthetic wind, said steer control device comprising a steer driving means responsive to said steer angle control device based on the measured values of the synthetic wind and the ebb and flow; and j. a cruise control device to control windmill, generator, and motor revolution in response to each datum of current position and set target position data, current direction and velocity of the natural wind, and direction and velocity of the ebb and flow, so as to set thrust force of the vessel as either one of wind force, electric power, or the wind force and electric power, and to set a cruising course toward the target point in real time.

4. A vessel in accordance with claim 3, further comprising a raft with a solar battery thereon for charging the storage battery.

* * * * *